(12) United States Patent
Hwang et al.

(10) Patent No.: US 10,305,144 B2
(45) Date of Patent: *May 28, 2019

(54) LITHIUM SECONDARY BATTERY

(71) Applicant: SK Innovation Co., Ltd., Seoul (KR)

(72) Inventors: Duck-Chul Hwang, Suwon-si (KR); Kyung-Bin Yoo, Daejeon (KR); Kook-Hyun Han, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 570 days.

This patent is subject to a terminal disclaimer.

(21) Appl. No.: 14/956,721

(22) Filed: Dec. 2, 2015

(65) Prior Publication Data

US 2016/0164077 A1     Jun. 9, 2016

(30) Foreign Application Priority Data

Dec. 3, 2014 (KR) .......... 10-2014-0172051

(51) Int. Cl.
| | |
|---|---|
| *H01M 10/0567* | (2010.01) |
| *H01M 4/485* | (2010.01) |
| *H01M 10/052* | (2010.01) |
| *H01M 4/36* | (2006.01) |
| *H01M 4/505* | (2010.01) |
| *H01M 4/525* | (2010.01) |

(52) U.S. Cl.
CPC ....... *H01M 10/0567* (2013.01); *H01M 4/366* (2013.01); *H01M 4/485* (2013.01); *H01M 4/505* (2013.01); *H01M 4/525* (2013.01); *H01M 10/052* (2013.01); *H01M 2300/0025* (2013.01)

(58) Field of Classification Search
CPC .......... H01M 10/0567; H01M 10/052; H01M 4/366; H01M 4/505; H01M 4/525; H01M 4/485; H01M 2300/0025
See application file for complete search history.

(56) References Cited

U.S. PATENT DOCUMENTS

| | | | | |
|---|---|---|---|---|
| 2009/0068561 | A1* | 3/2009 | Sun ........................ | H01M 4/131 429/223 |
| 2010/0015514 | A1 | 1/2010 | Miyagi et al. | |
| 2011/0052980 | A1* | 3/2011 | Sakata .................. | H01M 4/131 429/199 |
| 2014/0087266 | A1* | 3/2014 | Li .......................... | H01M 4/485 429/231.3 |
| 2014/0158932 | A1* | 6/2014 | Sun ......................... | H01M 4/13 252/182.1 |
| 2015/0349381 | A1* | 12/2015 | Hwang ............. | H01M 10/0567 429/188 |

FOREIGN PATENT DOCUMENTS

| | | |
|---|---|---|
| CN | 101572331 A | 11/2009 |
| KR | 10-2006-0134631 A | 6/2007 |
| WO | WO 2013/183974 | * 12/2013 |

* cited by examiner

*Primary Examiner* — Laura Weiner
(74) *Attorney, Agent, or Firm* — IP & T Group LLP

(57) ABSTRACT

Disclosed is a lithium secondary battery, including a cathode, an anode and a non-aqueous electrolyte, wherein the cathode includes a cathode active material containing lithium-metal oxide of which at least one of metals has a concentration gradient region between a core part and a surface part thereof, and the non-aqueous electrolyte includes a lithium salt, a polyfunctional nitrile compound and an organic solvent, such that the high-temperature storage and lifespan properties may be improved.

15 Claims, 4 Drawing Sheets

LITHIUM SECONDARY BATTERY

CROSS-REFERENCE TO RELATED APPLICATION

This application claims priority to Korean Patent Application No. 10-2014-0172051 filed Dec. 3, 2014, the disclosure of which is hereby incorporated in its entirety by reference.

BACKGROUND OF THE INVENTION

1. Field of the Invention

The present invention relates to a lithium secondary battery, and more specifically, to a lithium secondary battery with excellent high-temperature storage and life span properties.

2. Description of the Related Art

With rapid progress of electronic, telecommunication and computer industries, portable electronic communication devices such as a camcorder, mobile phone, notebook PC, etc. have been remarkably developed. Accordingly, the demand for a lithium secondary battery as a power source capable of driving the above device is also increased. In particular, with regard to applications of eco-friendly power sources such as an electric car, uninterruptible power supply, electromotive tool and satellite, research and development have been actively proceeded in domestic field and other countries such as Japan, Europe, United States, etc.

Among currently used secondary batteries, the lithium secondary battery developed since early 1990's includes an anode made of a carbon material capable of absorbing and desorbing lithium ions, a cathode made of lithium-containing oxide, and a non-aqueous electrolyte containing lithium salt dissolved in a mixed organic solvent in a suitable amount.

In this regard, as the application of the lithium secondary battery is more enlarged, a case that the lithium secondary battery should be used even under more severe environments increase.

However, lithium transition metal oxide or composite oxide used as a cathode active material of the lithium secondary battery entails a problem that a metal component is desorbed from the cathode during storage at a high temperature under fully charged condition, hence being in thermally unstable state.

In order to solve the above problem, Korean Patent Laid-Open Publication No. 2006-0134631 discloses a cathode active material of core-shell structure having a core part and a shell part which are made of lithium transition metal oxides different from each other, however, still has lack of improvement in life-span property.

SUMMARY OF THE INVENTION

Accordingly, it is an object of the present invention to provide a lithium secondary battery with excellent high-temperature and life-span properties.

The above object of the present invention will be achieved by the following characteristics:

(1) A lithium secondary battery, including a cathode, an anode and a non-aqueous electrolyte, wherein the cathode includes a cathode active material containing lithium-metal oxide of which at least one of metals has a concentration gradient region between a core part and a surface part thereof, and the non-aqueous electrolyte includes a lithium salt, a polyfunctional nitrile compound and an organic solvent.

(2) The lithium secondary battery according to the above (1), wherein another of the metals included in the lithium-metal oxide has a constant concentration between the core part and the surface part.

(3) The lithium secondary battery according to the above (1), wherein the lithium-metal oxide includes a first metal having a concentration gradient region with increased concentration between the core part and the surface part, and a second metal having a concentration gradient region with decreased concentration between the core part and the surface part.

(4) The lithium secondary battery according to the above (1), wherein the lithium-metal oxide is represented by Formula 1 below, wherein at least one of M1, M2 and M3 has a concentration gradient region between the core part and the surface part:

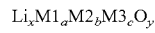 [Formula 1]

(wherein M1, M2 and M3 are selected from a group consisting of Ni, Co, Mn, Na, Mg, Ca, Ti, V, Cr, Cu, Zn, Ge, Sr, Ag, Ba, Zr, Nb, Mo, Al, Ga and B, and $0 < x \leq 1.1$, $2 \leq y \leq 2.02$, $0 \leq a \leq 1$, $0 \leq b \leq 1$, $0 \leq c \leq 1$, and $0 < a+b+c \leq 1$).

(5) The lithium secondary battery according to the above (4), wherein at least one of the M1, M2 and M3 has a concentration gradient region with increased concentration between the core part and the surface part, while the others have a concentration gradient region with decreased concentration between the core part and the surface part.

(6) The lithium secondary battery according to the above (4), wherein at least one of the M1, M2 and M3 has a concentration gradient region with increased concentration between the core part and the surface part, another has a concentration gradient region with decreased concentration between the core part and the surface part, and the other has a constant concentration between the core part and the surface part.

(7) The lithium secondary battery according to the above (4), wherein the M1, M2 and M3 are Ni, Co and Mn, respectively.

(8) The lithium secondary battery according to any one of the above (4) to (7), wherein the M1 is Ni, and $0.6 \leq a \leq 0.95$ and $0.05 \leq b+c \leq 0.4$.

(9) The lithium secondary battery according to any one of the above (4) to (7), wherein the M1 is Ni, and $0.7 \leq a \leq 0.9$ and $0.1 \leq b+c \leq 0.3$.

(10) The lithium secondary battery according to the above (1), wherein the lithium-metal oxide has a primary particle of a rod-type shape.

(11) The lithium secondary battery according to the above (1), wherein the polyfunctional nitrile compound is a dinitrile compound, trinitrile compound or a mixture thereof.

(12) The lithium secondary battery according to the above (1), wherein the polyfunctional nitrile compound is at least one selected from a group consisting of succinonitrile, sebaconitrile, glutaronitrile, adiponitrile, 1,5-dicyanopentane, 1,6-dicyanohexane, 1,7-dicyanoheptane, 1,8-dicyanooctane, 1,9-dicyanononane, 1,10-dicycathodecane, 1,12-dicyanododecane, tetramethyl succinonitrile, 2-methyl glutaronitrile, 2,4-dimethyl glutaronitrile, 2,2,4,4-tetramethyl glutaronitrile, 1,4-dicyanopentane, 2,5-dimethyl-2,5-hexane dicarbonitrile, 2,6-dicyanoheptane, 2,7-dicyanooctane, 2,8-dicyanononane, 1,6-dicycathodecane, 1,3,5-hexane tricarbonitrile and 1,3,6-hexane tricarbonitrile.

(13) The lithium secondary battery according to the above (1), wherein the polyfunctional nitrile compound is at least one selected from a group consisting of succinonitrile, glutaronitrile, adiponitrile, 1,3,5-hexane tricarbonitrile and 1,3,6-hexane tricarbonitrile.

(14) The lithium secondary battery according to the above (1), wherein the polyfunctional nitrile compound is included in an amount of 0.1 to 10% by weight to 100% by weight of a whole non-aqueous electrolyte.

(15) The lithium secondary battery according to the above (1), wherein the polyfunctional nitrile compound is included in an amount of 0.5 to 7% by weight to 100% by weight of a whole non-aqueous electrolyte.

(16) The lithium secondary battery according to the above (1), wherein the polyfunctional nitrile compound is included in an amount of 1 to 7% by weight to 100% by weight of a whole non-aqueous electrolyte.

(17) The lithium secondary battery according to the above (1), wherein a charge voltage ranges from 4.2 to 4.5V.

(18) The lithium secondary battery according to the above (1), wherein a charge voltage ranges from 4.2 to 4.4V.

(19) The lithium secondary battery according to the above (1), wherein a charge voltage ranges from 4.2 to 4.3V.

The lithium secondary battery of the present invention uses the non-aqueous electrolyte that includes a cathode active material containing a metal with a concentration gradient, and a specific additive, such that it is possible to achieve a significantly improve effect in both of the high-temperature storage and lifespan properties.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
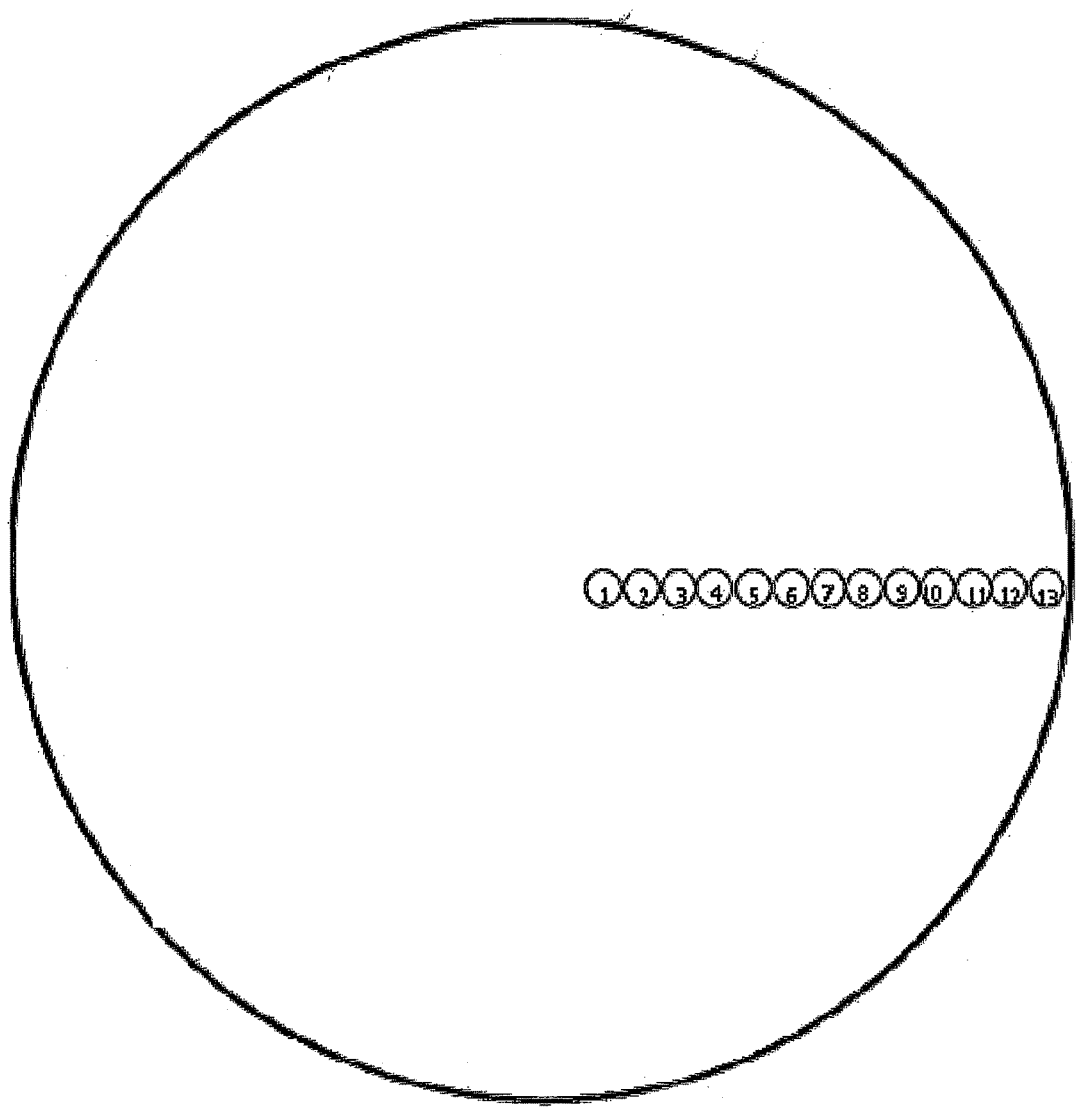
FIG. 1 is a view schematically illustrating a site of measuring a concentration of metal elements included in lithium-metal oxide according to an embodiment of the present invention.

The present invention discloses a lithium secondary battery, including a cathode, an anode and a non-aqueous electrolyte, wherein the cathode includes a cathode active material containing lithium-metal oxide of which at least one of metals has a concentration gradient region between a core part and a surface part thereof, and the non-aqueous electrolyte includes a lithium salt, a polyfunctional nitrile compound and an organic solvent, such that the high-temperature storage and lifespan properties may be improved.

Hereinafter, exemplary embodiments of the present invention will be described in detail with reference to the accompanying drawings.

Cathode Active Material

The cathode active material according to the present invention includes lithium-metal oxide of which at least one of metals has a concentration gradient between a core part and a surface part thereof. Such a cathode active material exhibits superior life-span property, compared to a cathode active material without a change in concentration.

In the present invention, the fact that the metal of the lithium-metal oxide has a concentration gradient region between the core part and the surface part, means that other metals except for lithium may have a concentration distribution region varying in a constant tendency between a core part and a surface part of a lithium-metal oxide particle. The concentration distribution region (that is, concentration gradient region) may be positioned at any portion between the core part and the surface part, without particular limitation thereof. The constant tendency means that a development of concentration change is decreased or increased, however, does not exclude that a value opposed to the above tendency may be represent at a position.

In the present invention, the core part of the particle means an area within 0.1 µm radius from a center of the active material particle, while the surface part means an area within 0.1 µm from the outmost portion of the particle.

The cathode active material according to the present invention may include at least one of metals having a concentration gradient. Therefore, as one embodiment, the cathode active material may include a first metal having a concentration gradient region with increased concentration between the core part and the surface part, and a second metal having a concentration gradient region with decreased concentration between the core part and the surface part. The first metal or second metal may be independently at least one of metals.

As another embodiment of the present invention, the cathode active material according to the present invention may include a metal having a constant concentration between the core part and the surface part.

A specific example of the cathode active material according to the present invention may include lithium-metal oxide represented by Formula 1 below, wherein at least one of M1, M2 and M3 has a concentration gradient between the core part and the surface part:

  [Formula 1]

$Li_xM1_aM2_bM3_cO_y$ (wherein M1, M2 and M3 are selected from a group consisting of Ni, Co, Mn, Na, Mg, Ca, Ti, V, Cr, Cu, Zn, Ge, Sr, Ag, Ba, Zr, Nb, Mo, Al, Ga and B; and $0<x\leq1.1$, $2\leq y\leq2.02$, $0\leq a\leq1$, $0\leq b\leq1$, $0\leq c\leq1$, and $0<a+b+c\leq1$).

According to one embodiment of the present invention, at least one of M1, M2 and M3 may have a concentration gradient region with increased concentration between the core part and the surface part, while the others may have a concentration gradient region with decreased concentration between the core part and the surface part.

According to another embodiment of the present invention, at least one of M1, M2 and M3 may have a concentration gradient region with increased concentration between the core part and the surface part, another may have a concentration gradient region with decreased concentration between the core part and the surface part, and the other may have a constant concentration between the core part and the surface part.

According to a specific example of the present invention, M1, M2 and M3 may be Ni, Co and Mn, respectively.

The lithium-metal oxide according to the present invention may have a relatively higher content of Ni. Using Ni may be helpful for improving a capacity of the battery. For a structure of the conventional cathode active material, if a content of Ni is high, life-span is reduced. However, in a case of the cathode active material according to the present invention, the life-span property is not deteriorated even if it has a high content of Ni. Therefore, the cathode active material of the present invention may express excellent life-span property while maintaining a high capacity.

For example, with regard to the lithium-metal oxide according to the present invention, a molar ratio of nickel may range from 0.6 to 0.95, and preferably, 0.7 to 0.9. That is, if M1 is Ni in the above Formula 1, it may be $0.6 \leq a \leq 0.95$ and $0.05 \leq b+c \leq 0.4$, and preferably, $0.7 \leq a \leq 0.9$ and $0.1 \leq b+c \leq 0.3$.

A particle shape of the lithium-metal oxide according to the present invention is not particularly limited, but a primary particle thereof preferably has a rod-type shape.

A particle size of the lithium-metal oxide according to the present invention is not particularly limited, and may be a range of 3 to 25 μm, for example.

The cathode active material according to the present invention may further include a coating layer on the above-described lithium-metal oxide. The coating layer may be made of a metal or metal oxide including, for example, Al, Ti, Ba, Zr, Si, B, Mg and P, and alloys thereof or oxides of the above metal.

As necessary, the cathode active material according to the present invention may include a configuration in which the above-described lithium-metal oxide is doped with a metal. Such a doping metal may include, for example, Al, Ti, Ba, Zr, Si, B, Mg, P, V, W, or the like, which are used alone or in combination of two or more thereof.

The lithium-metal oxide according to the present invention may be prepared by co-precipitation.

Hereinafter, a method for preparing a cathode active material according to one embodiment of the present invention will be described.

First, a metal salt aqueous solution for forming a core part is prepared, and then, a metal salt aqueous solution for forming a surface part is prepared. Next, the metal salt aqueous solution for forming a core part is mixed with the metal salt aqueous solution for forming a surface part according to a required concentration gradient, and a chelating agent and an alkaline aqueous solution are mixed in a reactor, so as to prepare a precipitate having a concentration gradient of at least one metal element between the core part and the surface part.

After the prepared precipitate is subjected to heat treatment, if it is mixed with a lithium salt and the mixture is again subjected to heat treatment, a cathode active material according to the present invention may be obtained.

Anode Active Material

The anode active material according to the present invention may include any material known in the related art, so long as it can absorb and desorb lithium ions, without particular limitation thereof. For example, carbon materials such as crystalline carbon, amorphous carbon, carbon composite, carbon fiber, etc., lithium metal, alloys of lithium and other elements, silicon, or tin may be used.

Such amorphous carbon may include, for example, hard carbon, cokes, mesocarbon microbead (MCMB) calcined at a temperature of 1500° C. or less, mesophase pitch-based carbon fiber (MPCF), or the like.

The crystalline carbon may include graphite materials, and specifically, natural graphite, graphite cokes, graphite MCMB, graphite MPCF, or the like. Other elements used together with lithium to form an alloy thereof may include, for example, aluminum, zinc, bismuth, cadmium, antimony, silicone, lead, tin, gallium or indium.

Non-Aqueous Electrolyte

The non-aqueous electrolyte according to the present invention may include a lithium salt and an organic solvent, and further include a polyfunctional nitrile compound.

The polyfunctional nitrile compound refers to a compound containing at least two or more nitrile groups and may include, for example, a nitrile compound, a tri-nitrile compound, and a mixture thereof.

The polyfunctional nitrile compound may maintain excellent life-span property and remarkably improve high-temperature storage property, as well as, if it is used together with the cathode active material according to the present invention. The reason is that the polyfunctional nitrile compound is adsorbed to the surface of the cathode active material to prevent degradation of an electrolyte, but it should not be construed as limited to such a determination.

A specific example of the polyfunctional nitrile compound according to the present invention may include, succinonitrile, sebaconitrile, glutaronitrile, adiponitrile, 1,5-dicyanopentane, 1,6-dicyanohexane, 1,7-dicyanoheptane, 1,8-dicyanooctane, 1,9-dicyanononane, 1,10-dicycathodecane, 1,12-dicyanododecane, tetramethyl succinonitrile, 2-methyl glutaronitrile, 2,4-dimethyl glutaronitrile, 2,2,4,4-tetramethyl glutaronitrile, 1,4-dicyanopentane, 2,5-dimethyl-2,5-hexane dicarbonitrile, 2,6-dicyanoheptane, 2,7-dicyanooctane, 2,8-dicyanononane, 1,6-dicycathodecane, 1,3,5-hexane tricarbonitrile, 1,3,6-hexane tricarbonitrile, or the like, but it is not particularly limited thereto. These compounds may be used alone or in combination of two or more thereof. Preferably, the polyfunctional nitrile compound is at least one selected from a group consisting of succinonitrile, glutaronitrile, adiponitrile, 1,3,5-hexane tricarbonitrile and 1,3,6-hexane tricarbonitrile.

The polyfunctional nitrile compound according to the present invention may be included in an amount of 0.1 to 10% by weight ('wt. %') to 100 wt. % of a whole non-aqueous electrolyte, preferably, 0.5 to 7 wt. %, and more preferably, 1 to 7 wt. %. Within the above range, excellent charging performance may be exhibited.

The lithium salt may include any one typically used for a lithium secondary battery electrolyte without particular limitation thereof, and may be represented by $Li^+X^-$. Anions of such a lithium salt are not particularly limited, but may include for example, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$, which are used alone or in combination of two or more thereof.

The organic solvent may include any one typically used for the lithium secondary battery electrolyte without particular limitation thereof. Representative examples may include any one selected from a group consisting of propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxyethane, diethoxyethane, sulforane, γ-butyrolactone, tetrahydrofurane, ethyl propionate, ethyl acetate and propyl acetate, or a mixture of two or more thereof.

The non-aqueous electrolyte may optionally further include any additive known in the related art without particular limitation thereof. For example, at least one of vinylene carbonate, propylene sulfite, propene sultone, propane sultone, etc. may be included, but it is not particularly limited thereto.

Secondary Battery

The present invention provides a lithium secondary battery fabricated using a cathode containing the above-described cathode active material, an anode containing the above-described anode active material, and the above-described non-aqueous electrolyte.

The lithium secondary battery including the cathode active material and non-aqueous electrolyte according to the present invention may be chargeable with a charge voltage used in the related art. For example, the charge voltage may be a range of 4.2 to 4.5 V, preferably, 4.2 to 4.4 V, and more preferably, 4.2 to 4.3 V.

The cathode may be formed by adding a solvent and, optionally, a binder, conductive material, dispersant, etc. to the cathode active material, and agitating the same to prepare a cathode slurry, then applying (coating) the slurry to a collector made of a metal material, and drying and pressing the same.

The anode may be formed by adding a solvent and, optionally, a binder, conductive material, dispersant, etc. to the anode active material and agitating the same to prepare an anode negative slurry, applying the slurry to a collector made of a metal material (coating), drying and pressing the same.

The binder may include any one commonly used in the related art without particular limitation thereof. For example, an organic binder such as polyvinylidene fluoride-hexafluoropropylene copolymer (PVDF-co-HFP), polyvinylidene fluoride (PVDF), polyacrylonitrile, polymethyl methacrylate, etc.; or an aqueous binder such as styrene-butadiene rubber (SBR), etc., may be used together with a thickener such as carboxymethyl cellulose (CMC).

The conductive material may include any conductive carbon substance generally used in the related art without particular limitation thereof.

The collector made of a metal material is a metal having high conductivity and being easily attached with a mixture of the cathode or anode active material. The metal used herein may include any one if it does not have reactivity in the voltage range of the battery. A non-limited example of the cathode active material may include a foil made of aluminum, nickel, or a combination thereof. A non-limited example of the anode active material may include a foil made of copper, gold, nickel or a copper alloy, or a combination thereof.

A separator may be present between the cathode and the anode. Such a separator may be made of a conventional porous polymer film typically used as a separator in the related art, for example, a porous polymer film made of a polyolefin polymer such as ethylene homopolymer, propylene homopolymer, ethylene/butene copolymer, ethylene/hexene copolymer or ethylene/methacrylate copolymer, which may be used alone or as a laminate formed by stacking up the same. Otherwise, typical porous woven fabrics, for example, a woven fabric made of high-melting point glass fiber, polyethylene terephthalate fiber, etc., may be used, but it is not particularly limited thereto. The separator may be applied to a battery by any general method such as winding. Besides, lamination (stacking) and folding of the separator and the electrode may also be used.

The above-described non-aqueous electrolyte for a lithium secondary of the present invention may be introduced into an electrode structure including a cathode, an anode, and a separator installed between the cathode and the anode, so as to fabricate a lithium secondary battery. An appearance of the lithium secondary battery of the present invention is not particularly limited, but may include, for example, a cylindrical or square form using a can, a pouch type or a coin type.

Hereinafter, preferred embodiments are proposed to more concretely describe the present invention. However, the following examples are only given for illustrating the present invention and those skilled in the art will obviously understand that various alterations and modifications are possible within the scope and spirit of the present invention. Such alterations and modifications are duly included in the appended claims.

Example 1

Cathode

Lithium-metal oxide (hereinafter, CAM-10) with a whole composition of $LiNi_{0.80}Co_{0.10}Mn_{0.10}O_2$, a core part composition of $LiNi_{0.83}Co_{0.10}Mn_{0.07}O_2$ and a surface part composition of $LiNi_{0.78}Co_{0.10}Mn_{0.12}O_2$, having a concentration gradient region of nickel and manganese at a middle portion between the core part and the surface part as a cathode active material, Denka Black as a conductive material, and PVDF as a binder were used in a weight ratio of 92:5:3, respectively, to prepare a cathode slurry. Thereafter, the slurry was applied to an aluminum substrate to coat the same, followed by drying and pressing to prepare a cathode.

For reference, the concentration gradient of the lithium-metal oxide used herein is listed in Table 1, and a measurement site of concentration is shown in FIG. 1. For the lithium-metal oxide particle with a distance between a core of a particle to the surface thereof, that is, 4.8 μm, the measurement sites were present at an interval of 0.4 μm from the core.

TABLE 1

| Site | Ni | Co | Mn |
|------|-------|-------|-------|
| 1 | 0.830 | 0.100 | 0.070 |
| 2 | 0.831 | 0.101 | 0.068 |
| 3 | 0.829 | 0.100 | 0.071 |
| 4 | 0.830 | 0.100 | 0.070 |
| 5 | 0.800 | 0.099 | 0.101 |
| 6 | 0.780 | 0.100 | 0.120 |
| 7 | 0.780 | 0.100 | 0.120 |
| 8 | 0.780 | 0.101 | 0.119 |
| 9 | 0.781 | 0.100 | 0.119 |
| 10 | 0.779 | 0.101 | 0.120 |
| 11 | 0.780 | 0.100 | 0.120 |
| 12 | 0.781 | 0.099 | 0.120 |
| 13 | 0.780 | 0.100 | 0.120 |

<Anode>

An anode slurry including 93 wt. % of natural graphite (d002 3.358 Å) as an anode active material, 5 wt. % of a flake type conductive material, that is, KS6 as a conductive material, 1 wt. % of SBR as a binder, and 1 wt. % of CMC as a thickener was applied to a copper substrate, followed by drying and pressing to prepare an anode.

<Battery>

By notching both of a cathode plate and an anode plate in a suitable size, respectively, laminating the same, and installing a separator (polyethylene with a thickness of 25 μm) between the cathode plate and the anode plate, a cell was fabricated. Tap parts of the cathode and the anode were welded, respectively.

A combination of the welded cathode/separator/anode was put into a pouch, followed by sealing three sides of the pouch except one side into which an electrolyte is injected. In this case, a portion having the gap is included in the sealing portion. After injecting the electrolyte through the remaining one side, the one side was also sealed, followed by impregnation for 12 hours or more. The electrolyte used herein was formed by preparing 1M $LiPF_6$ solution with a mixed solvent of EC/EMC/DEC (25/45/30; volume ratio), and adding 1 wt. % of vinylene carbonate (VC), 0.5 wt. % of 1,3-propene sultone (PRS), 0.5 wt. % of lithium bis(oxalato)borate (LiBOB), and 0.5 wt. % of succinonitrile (SN) thereto.

After then, pre-charging was conducted with a current (2.5 Å) corresponding to 0.25 C for 36 minutes. After 1 hour, degassing then aging for 24 hours or more were conducted, followed by chemical charging-discharging (charge condition: CC-CV 0.2 C 4.2 V 0.05 C CUT-OFF; discharge condition: CC 0.2 C 2.5 V CUT-OFF). Thereafter, standard charging-discharging was conducted (charge condition: CC-CV 0.5 C 4.2 V 0.05 C CUT-OFF; discharge condition: CC 0.5 C 2.5 V CUT-OFF).

With the fabricated cell, charging (CC-CV 2.0 C 4.2 V 0.05 C CUT-OFF) and discharging (CC 2.0 C 2.75 V CUT-OFF) were repeated 500 times, then, a discharge capacity at 500 times was calculated into % to a discharge capacity at 1 time, thus determining life-span property at room temperature.

After storing the charged cell under a condition of CC-CV 0.5 C 4.2 V 0.05 C CUT-OFF in an oven at 60° C. for 4 weeks, it was discharged under a condition of CC 0.5 C 2.75 V CUT-OFF. Then, the cell was charged under a condition of CC-CV 0.5 C 4.2 V 0.05 C CUT-OFF, followed by discharging again under a condition of CC 0.5 C 2.75 V CUT-OFF. By comparing this discharge amount with a discharge amount at standard discharging, a capacity recovery rate was measured.

The results thereof are listed in Table 3.

Examples 2 to 6

The same procedures as described in Example 1 were conducted to fabricate cells except that a content of succinonitrile and a charging voltage were changed as shown in Table 3. Next, life-span property was evaluated and results thereof are listed in Table 3.

Example 7

Cathode

Lithium-metal oxide (hereinafter, CAM-20) with a whole composition of $LiNi_{0.80}Co_{0.11}Mn_{0.09}O_2$, a core part composition of $LiNi_{0.802}Co_{0.11}Mn_{0.088}O_2$ and a surface part composition of $LiNi_{0.77}Co_{0.11}Mn_{0.12}O_2$, having a concentration gradient region of nickel and manganese at the surface part between the core part and the surface part as a cathode active material, Denka Black as a conductive material, and PVDF as a binder were used in a weight ratio of 92:5:3, respectively, to prepare a cathode slurry. Thereafter, the slurry was applied to an aluminum substrate to coat the same, followed by drying and pressing to prepare a cathode.

For reference, the concentration gradient of the lithium-metal oxide used herein is listed in Table 2, and a measurement site of concentration is shown in FIG. 1.

For the lithium-metal oxide particle with a distance between the core of a particle to the surface thereof, that is, 4.8 µm, the measurement site was present at 0.4 µm interval from the core.

TABLE 2

| Site | Ni | Co | Mn |
|------|-------|-------|-------|
| 1 | 0.802 | 0.110 | 0.088 |
| 2 | 0.801 | 0.111 | 0.088 |
| 3 | 0.802 | 0.110 | 0.088 |
| 4 | 0.802 | 0.110 | 0.088 |
| 5 | 0.803 | 0.111 | 0.086 |
| 6 | 0.802 | 0.110 | 0.088 |
| 7 | 0.802 | 0.110 | 0.088 |
| 8 | 0.802 | 0.109 | 0.089 |
| 9 | 0.801 | 0.110 | 0.089 |
| 10 | 0.802 | 0.110 | 0.088 |
| 11 | 0.802 | 0.108 | 0.090 |
| 12 | 0.800 | 0.110 | 0.090 |
| 13 | 0.770 | 0.110 | 0.120 |

The other processes were substantially the same as those described in Example 1. After evaluating life-span and high-temperature storage properties, results thereof are listed in Table 3.

Examples 8 to 12

The same procedures as described in Example 7 were conducted to fabricate cells except that a content of succinonitrile and a charging voltage were changed as shown in Table 3 below. After evaluating life-span and high-temperature storage properties, results thereof are listed in Table 3.

Examples 13 to 15

The same procedures as described in Example 3 were conducted to fabricate cells except that the type of polyfunctional nitrile compound (glutaronitrile (GN), adiponitrile (AN), 1,3,5-hexane tricarbonitrile (HTCN)) was changed as shown in Table 3 below. After evaluating life-span and high-temperature storage properties, results thereof are listed in Table 3.

Examples 16 to 18

The same procedures as described in Example 9 were conducted to fabricate cells except that the type of polyfunctional nitrile compound (glutaronitrile (GN), adiponitrile (AN), 1,3,5-hexane tricarbonitrile (HTCN)) was changed as shown in Table 3 below. After evaluating life-span and high-temperature storage properties, results thereof are listed in Table 3.

Examples 19 to 21

The same procedures as described in Example 3 were conducted to fabricate cells except that the charging voltage for evaluation of life-span and high-temperature storage properties was changed into 4.3V, 4.4V and 4.5V, respectively. After evaluating life-span and high-temperature storage properties, results thereof are listed in Table 4.

Comparative Examples 1 to 7

The same procedures as described in Example 1 were conducted to fabricate cells except that $LiNi_{0.8}Co_{0.1}Mn_{0.1}O_2$ (hereinafter, CAM-30) having a uniform composition throughout particles without a concentration gradient was used as a cathode active material, and a content of succinonitrile was changed as shown in Table 3 below.

Comparative Example 8

The same procedures as described in Example 1 were conducted to fabricate a cell except that the polyfunctional nitrile compound was not added. After evaluating life-span and high-temperature storage properties, results thereof are listed in Table 3.

Comparative Example 9

The same procedures as described in Example 7 were conducted to fabricate a cell except that the polyfunctional nitrile compound was not added. After evaluating life-span and high-temperature storage properties, results thereof are listed in Table 3.

Comparative Examples 10 to 12

The same procedures as described in Comparative Example 4 were conducted to fabricate cells except that the charging voltage for evaluation of life-span and high-temperature storage properties was changed into 4.3V, 4.4V and 4.5V, respectively. After evaluating life-span and high-temperature storage properties, results thereof are listed in Table 4.

Experimental Example 1

1. Life-Span Property at Room Temperature

After repeating the charging (CC-CV 2.0 C 4.2 V 0.05 C CUT-OFF) and discharging (CC 2.0 C 2.75 V CUT-OFF) with the cell prepared in each of the examples and comparative examples 500 times, the discharge capacity at 500 times was calculated in % to the discharge capacity at 1 time.

Results thereof are shown in Table 3 below.

By increasing the charge voltage to 4.3V, 4.4V and 4.5V, respectively, life-span property at room temperature was determined. The results thereof are shown in Table 4 below, compared to the results at 4.2V.

2. Capacity Recovery Rate

After storing the cell charged under a condition of CC-CV 0.5 C 4.2 V 0.05 C CUT-OFF according to each of the examples and comparative example in an oven at 60° C. for 4 weeks, the cell was discharged under a condition of CC 0.5 C 2.75 V CUT-OFF, then, charged again under a condition of CC-CV 0.5 C 4.2 V 0.05 C CUT-OFF and discharged under a condition of CC 0.5 C 2.75 V CUT-OFF. This discharge amount was compared to a discharge amount at standard charging/discharging, thus measuring a capacity recovery rate.

The results thereof are listed in Table 3.

Further, the life-span property at room temperature was measured while increasing the charge voltage to 4.3V, 4.4V and 4.5V, respectively.

TABLE 3

| Section | Cathode active material | Nitrile compound Type | Nitrile compound (Content, wt %) | Charge voltage (V) | Life-span (%) (500 cycle) | Capacity recovery rate after high-temperature storage for 4 weeks (%) |
|---|---|---|---|---|---|---|
| Example 1 | CAM-10 | SN | 0.5 | 4.2 | 80 | 82 |
| Example 2 | CAM-10 | SN | 1.0 | 4.2 | 79.5 | 86 |
| Example 3 | CAM-10 | SN | 3.0 | 4.2 | 79 | 89 |
| Example 4 | CAM-10 | SN | 5.0 | 4.2 | 78.4 | 93 |
| Example 5 | CAM-10 | SN | 7.0 | 4.2 | 77 | 95 |
| Example 6 | CAM-10 | SN | 9.0 | 4.2 | 74 | 97 |
| Example 7 | CAM-20 | SN | 0.5 | 4.2 | 80.5 | 81 |
| Example 8 | CAM-20 | SN | 1.0 | 4.2 | 80 | 85 |
| Example 9 | CAM-20 | SN | 3.0 | 4.2 | 79.5 | 87 |
| Example 10 | CAM-20 | SN | 5.0 | 4.2 | 79 | 92 |
| Example 11 | CAM-20 | SN | 7.0 | 4.2 | 77 | 94 |
| Example 12 | CAM-20 | SN | 9.0 | 4.2 | 76 | 95 |
| Example 13 | CAM-10 | GN | 3.0 | 4.2 | 78.5 | 88.5 |
| Example 14 | CAM-10 | AN | 3.0 | 4.2 | 79 | 89.5 |
| Example 15 | CAM-10 | HTCN | 3.0 | 4.2 | 78 | 90 |
| Example 16 | CAM-20 | GN | 3.0 | 4.2 | 79 | 87 |
| Example 17 | CAM-20 | AN | 3.0 | 4.2 | 79.5 | 87.5 |
| Example 18 | CAM-20 | HTCN | 3.0 | 4.2 | 78.5 | 88.5 |
| Comparative Example 1 | CAM-30 | SN | 0 | 4.2 | 70 | 80 |
| Comparative Example 2 | CAM-30 | SN | 0.5 | 4.2 | 68 | 82 |
| Comparative Example 3 | CAM-30 | SN | 1.0 | 4.2 | 67 | 83 |
| Comparative Example 4 | CAM-30 | SN | 3.0 | 4.2 | 64 | 85 |
| Comparative Example 5 | CAM-30 | SN | 5.0 | 4.2 | 60 | 87 |
| Comparative Example 6 | CAM-30 | SN | 7.0 | 4.2 | 58 | 89 |
| Comparative Example 7 | CAM-30 | SN | 9.0 | 4.2 | 52 | 90 |
| Comparative Example 8 | CAM-10 | SN | 0 | 4.2 | 80 | 78 |
| Comparative Example 9 | CAM-20 | SN | 0 | 4.2 | 81 | 77 |

Referring to the above Table 3, it can be seen that the cells in the examples exhibit superior life-span and high-temperature storage (capacity recovery rate after high-temperature storage) properties, compared to those in the comparative examples.

Specifically, it can be seen that the examples show a larger absolute value of the capacity recovery rate after high-temperature storage than those of the comparative examples. Specifically, it could be found that a decrease in life-span is smaller than those of the comparative examples.

From Comparative Examples 1 to 7, it could be found that using the polyfunctional nitrile compound as an additive may cause a tendency of deteriorating the life-span property whereas the high-temperature storage property may be improved. However, it could also be understood from the examples that using a cathode active material having a concentration gradient region between the core part and the surface part may remarkably improve the high-temperature storage property while not greatly deteriorating the life-span property, even when the polyfunctional nitrile compound is used as an additive.

Figure 2:
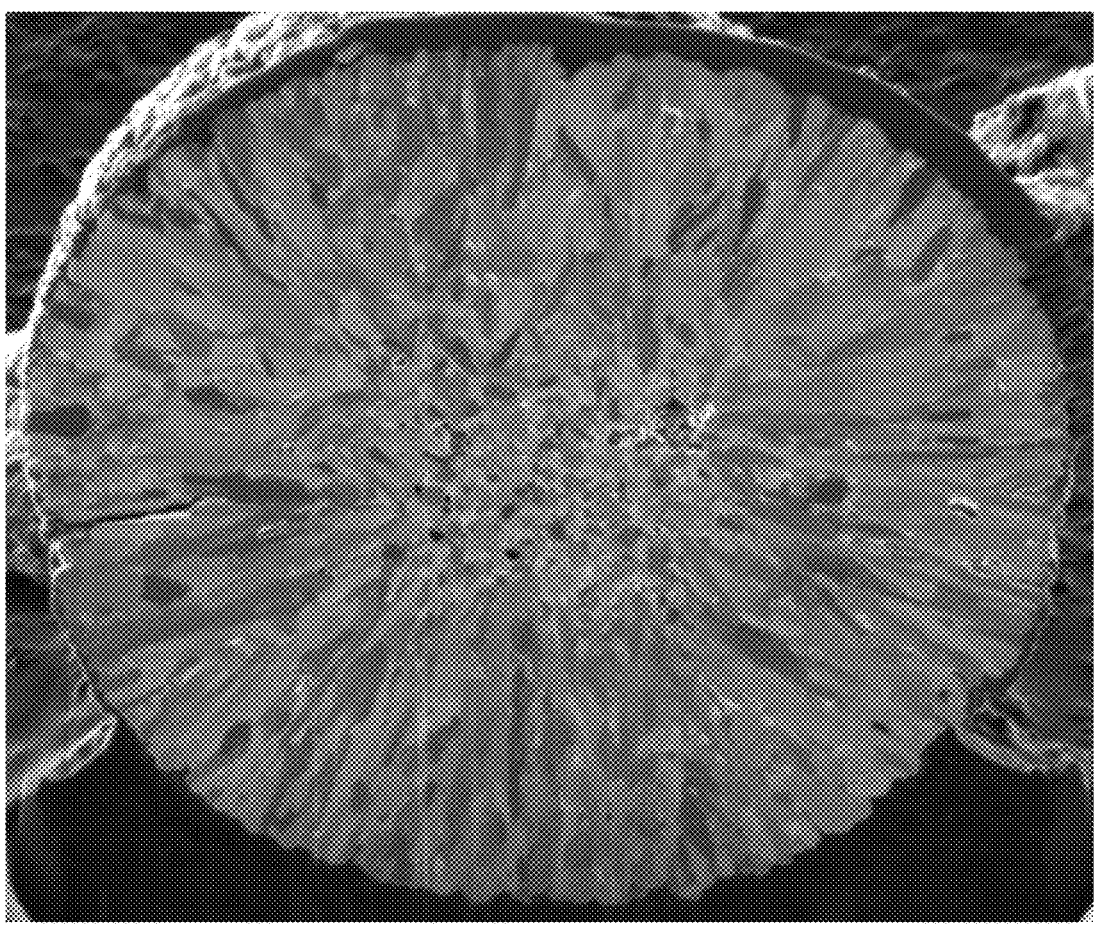
FIG. 2 is a photograph illustrating a cross section of a lithium-metal oxide according to Example 1.
Figure 3:
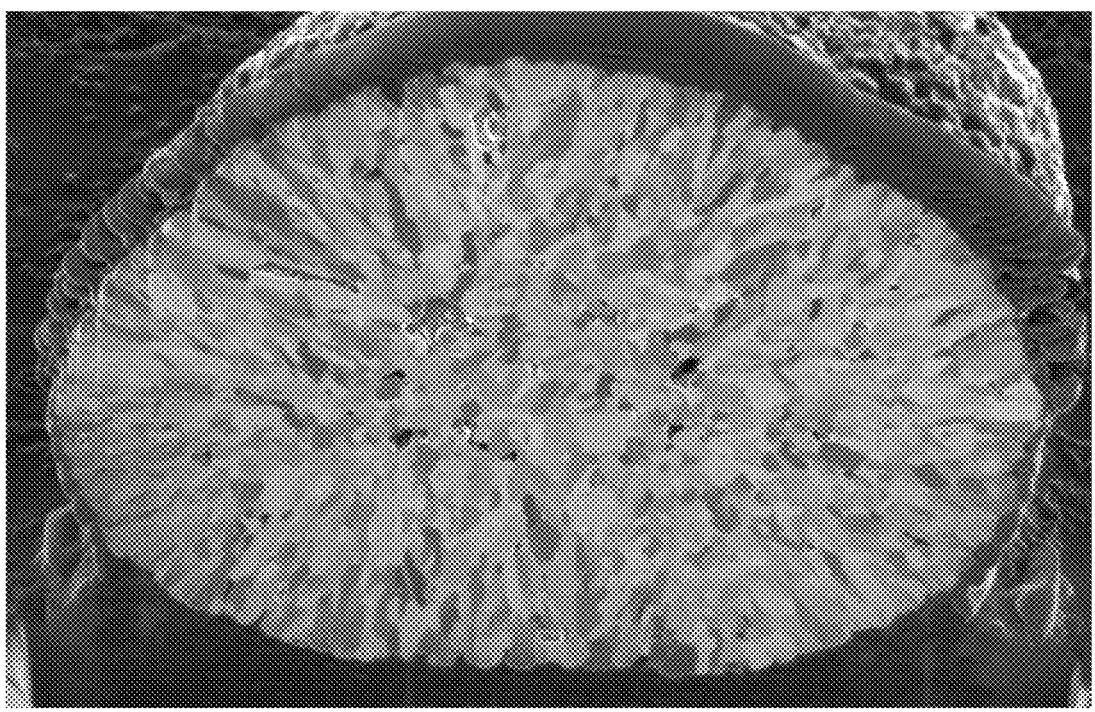
FIG. 3 is a photograph illustrating a cross section of a lithium-metal oxide according to Example 7.
Figure 4:
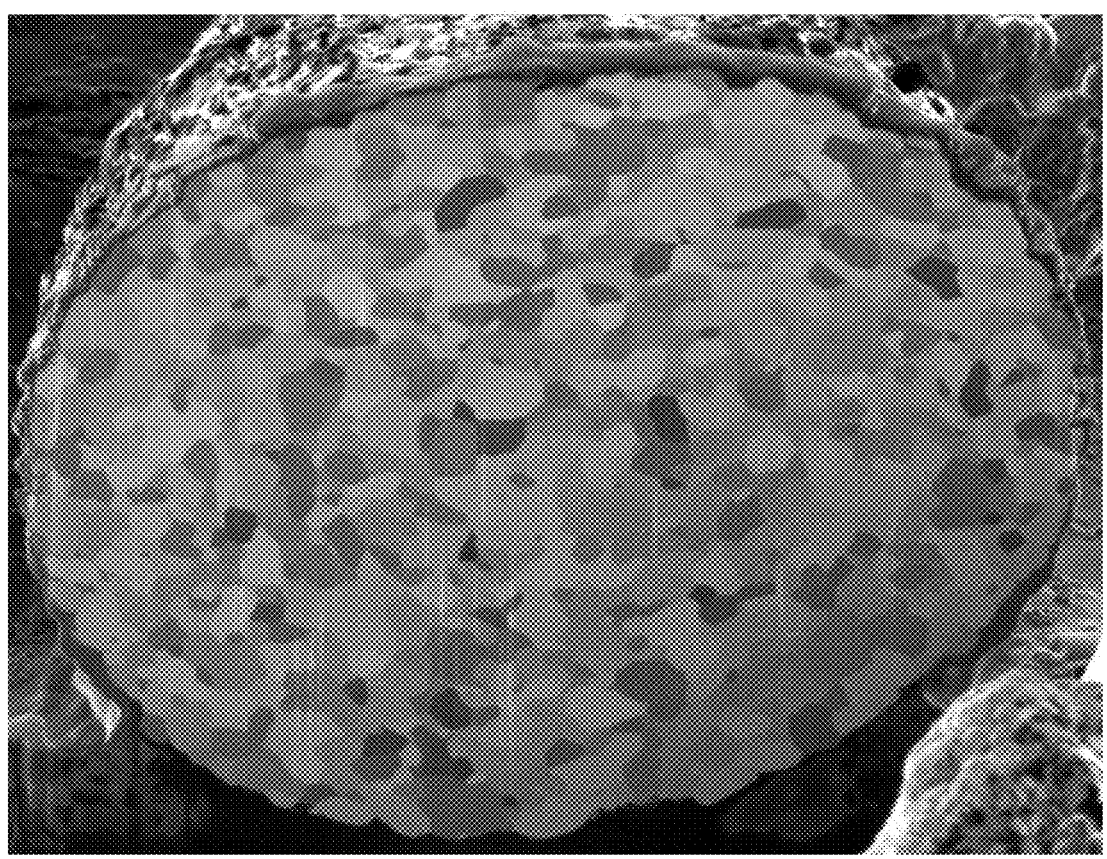
FIG. 4 is a photograph illustrating a cross section of a lithium-metal oxide according to Comparative Example 1.

Further, FIGS. 2, 3 and 4 illustrate cross-sectional images of the cathode active materials used in Example 1, Example 7 and Comparative Example 1, respectively. Referring to FIG. 2 (Example 1), FIG. 3 (Example 7) and FIG. 4 (Comparative Example 1), it could be seen that the metal elements used for forming the cathode active materials prepared in Examples 1 and 7 have a concentration gradient, and the primary particle included in the cathode active material has a rod-type shape. If the primary particle has such a rod-type structure, it is considered that high-storage property may be more effectively improved.

TABLE 4

| Section | Cathode active material | Nitrile compound Tyep | (Content, wt %) | Charge voltage (V) | Life-span (%) (500 cycle) | Capacity recovery rate after leaving for 4 weeks (%) |
|---|---|---|---|---|---|---|
| Example 3 | CAM-10 | SN | 3.0 | 4.2 | 79 | 89 |
| Example 19 | CAM-10 | SN | 3.0 | 4.3 | 78 | 85 |
| Example 20 | CAM-10 | SN | 3.0 | 4.4 | 76 | 82 |
| Example 21 | CAM-10 | SN | 3.0 | 4.5 | 55 | 70 |
| Comparative Example 4 | CAM-30 | SN | 3.0 | 4.2 | 64 | 85 |
| Comparative Example 10 | CAM-30 | SN | 3.0 | 4.3 | 35 | 76 |
| Comparative Example 11 | CAM-30 | SN | 3.0 | 4.4 | 23 | 70 |
| Comparative Example 12 | CAM-30 | SN | 3.0 | 4.5 | 20 | 61 |

Referring to the above Table 4, it can be seen that the cells of the examples exhibit superior life-span and high-temperature storage (capacity recovery rate after high temperature storage) properties, compared to those of the comparative examples, even when a high charge voltage is used.

If applying such a high charge voltage, life-span and high-temperature storage properties are generally deteriorated. However, in a case of Example 3 and Examples 19 to 21 using the cathode active material with a concentration gradient of the present invention, it could be found that a decrease in life-span and a decrease in capacity recovery rate after high-temperature storage were noticeably reduced, compared to the comparative examples.

What is claimed is:

1. A lithium secondary battery, comprising a cathode, an anode and a non-aqueous electrolyte,
   wherein the cathode includes a cathode active material containing a lithium-metal oxide containing Ni, Co, and Mn, and having the Formula 1 below:

$Li_xM1_aM2_bM3_cO_y$, Formula 1

wherein M1, M2 and M3 are Ni, Co, and Mn, respectively, and
   $0<x\leq1.1$, $2\leq y\leq2.02$, $0<a\leq1$, $0<b\leq1$, $0<c\leq1$, and $0<a+b+c\leq1$,
   wherein the non-aqueous electrolyte includes a lithium salt, a polyfunctional nitrile compound and an organic solvent,
   wherein the cathode active material has regions comprising:
   a core part;
   a surface part; and
   an intermediate region between the core part and the surface part, the intermediate region comprising a concentration gradient region wherein at least one of Ni, Co, and Mn has a decreasing or increasing concentration gradient in a direction from the core part to the surface part, and a non-concentration gradient region wherein Ni, Co, and Mn do not have a concentration gradient in a direction from the core part to the surface part, and
   wherein the non-concentration gradient region is formed between the core part and the concentration gradient region, and between the concentration gradient region and the surface part.

2. The lithium secondary battery according to claim 1, wherein the concentration of Mn is increased within the concentration gradient region in the direction from the core part to the surface part, and the concentration of Ni is decreased within the concentration gradient region in the direction from the core part to the surface part.

3. The lithium secondary battery according to claim 1, wherein Co has a constant concentration throughout the cathode active material from the core part to the surface part.

4. The lithium secondary battery according to claim 1, wherein $0.6\leq a\leq0.95$ and $0.05\leq b+c\leq0.4$.

5. The lithium secondary battery according to claim 1, wherein $0.7\leq a\leq0.9$ and $0.1\leq b+c\leq0.3$.

6. The lithium secondary battery according to claim 1, wherein the lithium-metal oxide has a primary particle of a rod-type shape.

7. The lithium secondary battery according to claim 1, wherein the polyfunctional nitrile compound is a dinitrile compound, trinitrile compound or a mixture thereof.

8. The lithium secondary battery according to claim 1, wherein the polyfunctional nitrile compound is at least one selected from a group consisting of succinonitrile, sebaconitrile, glutaronitrile, adiponitrile, 1,5-dicyanopentane, 1,6-dicyanohexane, 1,7-dicyanoheptane, 1,8-dicyanooctane, 1,9-dicyanononane, 1,10-dicyathodecane, 1,12-dicyanododecane, tetramethyl succinonitrile, 2-methyl glutaronitrile, 2,4-dimethyl glutaronitrile, 2,2,4,4-tetramethyl glutaronitrile, 1,4-dicyanopentane, 2,5-dimethyl-2,5-hexane dicarbonitrile, 2,6-dicyanoheptane, 2,7-dicyanooctane, 2,8-dicyanononane, 1,6-dicyathodecane, 1,3,5-hexane tricarbonitrile and 1,3,6-hexane tricarbonitrile.

9. The lithium secondary battery according to claim 1, wherein the polyfunctional nitrile compound is at least one selected from a group consisting of succinonitrile, glutaronitrile, adiponitrile, 1,3,5-hexane tricarbonitrile and 1,3,6-hexane tricarbonitrile.

10. The lithium secondary battery according to claim 1, wherein the polyfunctional nitrile compound is included in an amount of 0.1 to 10% by weight to 100% by weight of a whole non-aqueous electrolyte.

11. The lithium secondary battery according to claim 1, wherein the polyfunctional nitrile compound is included in an amount of 0.5 to 7% by weight to 100% by weight of a whole non-aqueous electrolyte.

12. The lithium secondary battery according to claim 1, wherein the polyfunctional nitrile compound is included in an amount of 1 to 7% by weight to 100% by weight of a whole non-aqueous electrolyte.

13. The lithium secondary battery according to claim 1, wherein a charge voltage ranges from 4.2 to 4.5V.

14. The lithium secondary battery according to claim 1, wherein a charge voltage ranges from 4.2 to 4.4V.

15. The lithium secondary battery according to claim 1, wherein a charge voltage ranges from 4.2 to 4.3V.

* * * * *